US012789507B2

(12) United States Patent
Villey et al.

(10) Patent No.: US 12,789,507 B2
(45) Date of Patent: Nov. 10, 2026

(54) INSULATING GLAZING COMPRISING LAMINATED GLAZING WITH CONTROLLED INTERNAL ADHESION AND TEAR RESISTANCE

(71) Applicant: SAINT-GOBAIN GLASS FRANCE, Courbevoie (FR)

(72) Inventors: Richard Villey, Courbevoie (FR); Hadrien Heuclin, Courbevoie (FR); François Guillemot, Courbevoie (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 156 days.

(21) Appl. No.: 18/867,971

(22) PCT Filed: May 15, 2023

(86) PCT No.: PCT/FR2023/050693

§ 371 (c)(1),
(2) Date: Nov. 21, 2024

(87) PCT Pub. No.: WO2023/227839

PCT Pub. Date: Nov. 30, 2023

(65) Prior Publication Data

US 2025/0319688 A1 Oct. 16, 2025

(30) Foreign Application Priority Data

May 23, 2022 (FR) ...................................... 2204901

(51) Int. Cl.
*B32B 7/12* (2006.01)
*B32B 17/10* (2006.01)

(52) U.S. Cl.
CPC .......... *B32B 17/10055* (2013.01); *B32B 7/12* (2013.01); *B32B 17/10091* (2013.01);
(Continued)

(58) Field of Classification Search
CPC ................ B32B 7/12; B32B 17/10036; B32B 17/10064; B32B 17/10761
See application file for complete search history.

(56) References Cited

U.S. PATENT DOCUMENTS 4,865,918 A * 9/1989 Tanuma ............ B32B 17/10788 428/409

FOREIGN PATENT DOCUMENTS

FR 3 091 830 A1 7/2020
FR 3 100 155 A1 3/2021
(Continued)

OTHER PUBLICATIONS

International Search Report as issued in International Patent Application No. PCT/FR2023/050693, dated Sep. 6, 2023.
(Continued)

*Primary Examiner* — Elizabeth E Mulvaney
(74) *Attorney, Agent, or Firm* — CUSHMAN PARTNERS LLC

(57) ABSTRACT

An insulating glazing includes a parallel glazing assembly, two consecutive glazings in the assembly being separated by a cavity enclosing a gas layer, the insulating glazing including at least one laminated glazing, the at least one laminated glazing including two glass sheets between which is laminated an adhesive interlayer of thickness e, wherein the laminated glazing has a thickness of between 3 and 6 mm, the value of the adhesion of the glass to the adhesive interlayer measured by the TCT method at 33 $mm \cdot s^{-1}$ and 20° C. is between 4 $kJ/m^2$+8 $kJ/m^3$×e(mm) and 14 $kJ/m^2$+8 $kJ/m^3$×e(mm), and the adhesive interlayer has an opening resistance and a tear propagation resistance of greater than 30 $kJ/m^2$.

13 Claims, 1 Drawing Sheet

(52) U.S. Cl.
CPC .. *B32B 17/10119* (2013.01); *B32B 17/10137* (2013.01); *B32B 17/10174* (2013.01); *B32B 17/10761* (2013.01); *B32B 17/1077* (2013.01); *B32B 17/10779* (2013.01); *B32B 2250/03* (2013.01); *B32B 2307/102* (2013.01); *B32B 2571/00* (2013.01)

(56) References Cited

FOREIGN PATENT DOCUMENTS

| | | | |
|---|---|---|---|
| FR | 3 108 651 A1 | | 10/2021 |
| WO | WO 2024/133926 | * | 6/2024 |

OTHER PUBLICATIONS

Dixon, W. J., et al., "A method for obtaining and analyzing sensitivity data," Journal of the American Statistical Association, 43, (Year: 1948).
Muralidhar, S., et al., "Mechanical behaviour in tension of cracked glass bridged by an elastomeric ligament," Acta Materialia, vol. 48, Nos. 18-19, Dec. 1, 2000, pp. 4577-4588.
Fourton, P., et al., "Adhesion rupture in laminated glass: influence of adhesion on the energy dissipation mechanisms," Glass Structures & Engineering, vol. 5, pp. 397-410, (Year: 2020).

* cited by examiner

[Fig 1]
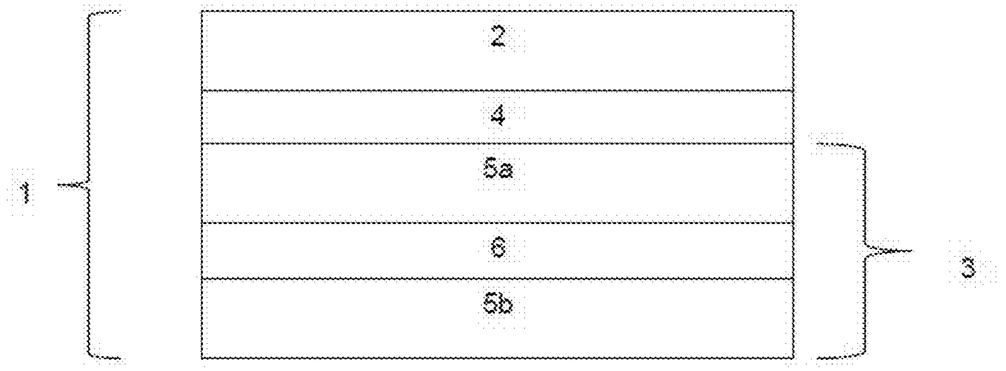
[Fig. 2]
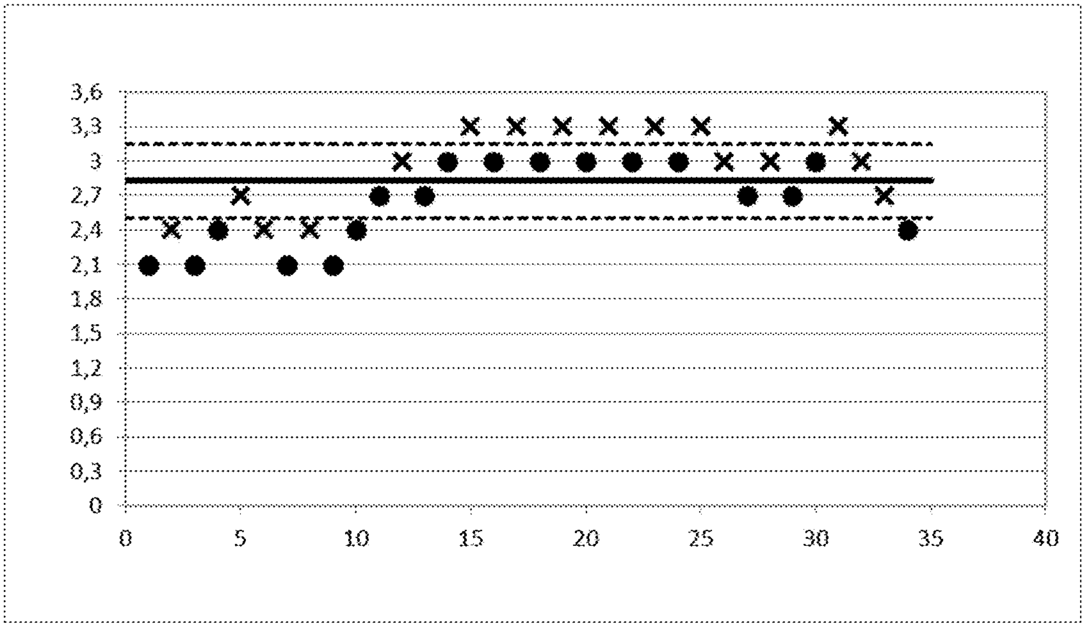

INSULATING GLAZING COMPRISING LAMINATED GLAZING WITH CONTROLLED INTERNAL ADHESION AND TEAR RESISTANCE

CROSS-REFERENCE TO RELATED APPLICATIONS

This application is the U.S. National Stage of PCT/FR2023/050693, filed May 15, 2023, which in turn claims priority to French patent application number 2204901 filed May 23, 2022. The content of these applications are incorporated herein by reference in their entireties.

The present invention relates to the field of glazing, and more particularly to an insulating glazing with improved impact resistance, that is, with an increased capacity to fully absorb the kinetic energy of an object impacting the glazing, that is, also to stop this object without it piercing the glazing, as well as good retention of glass splinters, in order to avoid injury to people.

Insulating glazings are conventionally made up of an assembly of several parallel glazings separated by a cavity containing a layer of gas, often insulating gas.

In the building industry in particular, where insulating glazings are widely used for soundproofing and thermal insulation, there is a growing demand for greater impact/puncture resistance, for burglary and vandalism protection, to protect people from glass breakage and the risks of falling against the glazing, and to ensure resistance to severe weather (hail), particularly in the case of insulating glazings for roof windows.

While the impact/puncture resistance of an insulating glazing is better than that of a monolithic single glazing, it is clear that an insulating glazing composed solely of monolithic glazing units does not offer sufficient impact/puncture resistance to provide burglar- and vandal-proof protection, or to protect people from glass breakage and the risks of falling against the glazing, or to guarantee resistance to severe weather conditions.

Laminated glazings, consisting of two glass sheets with an adhesive interlayer laminated between them, offers good impact/puncture resistance in some cases.

In particular, there is a need for glazings with good thermal and acoustic insulation properties, which also ensures the safety of residents, while not being too thick and heavy to install. The inventors set out to design insulating glazings to meet a wide range of requirements.

In accordance with a first requirement, the insulating glazings of the invention satisfy the maximum level of personal protection performance 1B1 of standard EN 12600, a level frequently required as, for example, in French standard AFNOR, NF DTU 39—Travaux de bâtiment—Travaux de vitrerie—miroiterie [Building work—Glazing work—glazing products], 2017, which concerns glazings guaranteeing that people do not fall into the void. In the above definition of the maximum performance level, the first “1” of “1B1” corresponds to a drop height of 1.20 m from an impactor at which the glazing either did not break, or broke safely with or without disintegration (disintegration after breakage being typical of tempered glass); the second “1” corresponds to a drop height of 1.20 m from an impactor at which the glazing either did not break, or broke safely without disintegration, that is, with very limited breakage and debris detachment, in accordance with EN 12600 paragraph 4.a). The letter “B” indicates breakage similar to laminated glass, while the letter “C” indicates breakage similar to tempered glass. There are levels with the letter “A” indicating breakage similar to that of annealed glass. In EN 12600, there are lower levels “2B2”, “2C2”, etc. for a drop height of 0.45 m from an impactor. The insulating glazings of the invention are designed to meet classification 1 of standard EN 12600, corresponding to a drop height of 1.20 m from an impactor. More generally, the ability of glazings to absorb shocks and stop an impactor without being broken, while retaining shards of glass, needs to be precisely known and understood, as this ability is critical to the safety of people and property.

In addition, EN 356 defines eight performance classes based on tests representing the ability of glazings to withstand objects thrown at it (levels 1 to or P1A to P5A of EN 356), or attempted break-ins with a sledgehammer or ax (levels 6 to 8 or P6B to P8B of EN 356). The thicker the sheets of glass in the laminated glazing, the better the EN 356 performance class. To increase the resistance of an insulating glazing, it may be a good idea for one of the glazings to be a laminated glazing. Compliance with level P1A, the least demanding of the EN 356 standard (protection against manual attack), is currently measured by a method known as ball drop testing (or hard body drop test), which consists in successively dropping three steel balls of 10 cm diameter and 4.1 kg mass from a certain height onto the glass; the three balls are dropped in an equilateral triangle of 13 cm per side centered on the glazing. To achieve level P1A, three glass samples must each withstand three successive ball drops from a height of 1.5 m.

From a statistical point of view, it is very difficult to draw clear conclusions on a glass’s performance due to the limited number of samples (determination of a failure probability at 1.5 m with only three samples).

A more robust method for assessing the performance of laminated glass according to EN 356 has been developed by the Applicant company and is known as “mean break height with three balls” (MBH3). This method involves dropping three balls successively from a certain height onto a laminated glass sample. If the sample passes the test without being broken by the three balls, then another laminated glass of the same type is tested, by dropping the three balls from a greater height corresponding to the height of the previous test plus a fixed increment value. If the sample does not pass the test, then another laminated glass of the same type is tested, by dropping the three balls from a lesser height corresponding to the height of the previous test minus a fixed increment value. By repeating this test, we will converge and then naturally oscillate around the mean break height of the glazing by three balls, in other words the height at which half the samples are broken and half are not; this allows precise quantification of the impact resistance of the laminated glass, that is, its ability to stop an impactor without it breaking the glazing. The starting height is preferably chosen close to the mean break height expected for the glazings tested, while the fixed increment value (plus or minus) is preferably close to the standard deviation of the probability distribution examined by the test (probability of failure in the three-ball test based on ball drop height). For a P1A performance test with a laminated glazing, a starting height of 2.1 m and an increment value of 0.3 m are chosen. Statistical processing of this method shows that the mean break height, together with the associated standard deviation and 95% confidence interval on the value of the mean break height, can be defined and calculated (see Dixon W. J. Mood A., “A method for obtaining and analyzing sensitivity data”, Journal of the American Statistical Association, 43, 1948). Once the mean break height and associated standard deviation have been obtained, we can then estimate whether the difference between the mean break height and the target height (e.g. 1.5 m for P1A) is large enough in view of the standard deviation of the distribution to ensure that the probability of failure at the target height is sufficiently low. For example, if the target height is 1.5 m, the mean break height is 2.1 m and the standard deviation is 0.3 m, this means that the difference of 0.6 m is twice the standard deviation, and the probability of failure at 1.5 m is therefore 2.3% for a normal (Gaussian) distribution. Thus, in accordance with a second requirement, the insulating glazings of the invention satisfy level P1A of the EN 356 standard, assessed by the mean break height method with three balls (MBH3).

In addition, the inventors have endeavored to design an insulating glazing comprising a laminated glazing with a thickness as close as possible to that of a monolithic pane of standard insulating glazing, enabling this monolithic pane to be replaced by this laminated glazing, without the need to replace the frame, spacers or seal of the insulating glazing, and/or one or more elements of its host structure (building opening, etc.). Such a standard insulating glazing monolithic pane thickness, in many targeted applications, is relatively thin, between 3 and 6 mm. An example is the substitution of one glass pane in a 24 mm-thick double glazing for two 4 mm-thick glass panes separated by a 16 mm-thick layer of gas.

The result is an insulating glazing that meets both requirements, plus the significant additional benefit disclosed previously. The invention therefore relates to an insulating glazing comprising a parallel glazing assembly, two consecutive glazings in the assembly being separated by a cavity enclosing a gas layer, said insulating glazing comprising at least one laminated glazing, the at least one laminated glazing comprising two glass sheets between which is laminated an adhesive interlayer of thickness e, characterized by the fact that the laminated glazing has a thickness of between 3 and 6 mm, the value of the adhesion of the glass to the adhesive interlayer measured by the TCT method at 33 $mm \cdot s^{-1}$ and 20° C. is between 4 $kJ/m^2$+8 $kJ/m^3$×e(mm) and 14 $kJ/m^2$+8 $kJ/m^3$×e(mm), and the adhesive interlayer has an opening resistance and a tear propagation resistance of greater than 30 $kJ/m^2$.

The insulating glazing of the invention is notably double glazing (one layer of gas), or triple glazing (two layers of gas).

The TCT method (acronym for Through-Cracked-Tensile (TCT) test) is a method for measuring the energy absorbed per unit area created between the crack lips of the broken glass, which area is created due to delamination at the glass-interlayer interface and deformation of the latter. This method is described in particular in "Mechanical behaviour in tension of cracked glass bridged by an elastomeric ligament", S. Muralidhar, A. Jagota, S. J. Bennison, S. Saigal, Acta Materialia, Volume 48, numbers 18-19, Dec. 1, 2000, pages 4577-4588, a document which also points out the importance for energy dissipation (and therefore for absorption of the kinetic energy of an object impacting the glazing) of these mechanisms of delamination at the glass-interlayer interface and of deformation of the latter. The value of the glass-adhesive layer adhesion measured by the TCT method at 33 $mm \cdot s^{-1}$ and 20° C. of between 4 $kJ/m^2$+8 $kJ/m^3$×e(mm) and 14 $kJ/m^2$+8 $kJ/m^3$×e(mm) corresponds substantially, at the adhesive interlayer thickness values used, to values between 4 and 7 on the Pummel scale, not too low to ensure good retention of glass fragments and prevent them from coming loose, but not too high to allow delamination, thus enabling substantial energy absorption during impact, without the interlayer tearing. In the present application, any mention of TCT tests also refers to the paper "Adhesion rupture in laminated glass: influence of adhesion on the energy dissipation mechanisms", P. Fourton, K. Piroird, M. Ciccotti and E. Barthel, *Glass Structures & Engineering*, vol. 5, pp. 397-410 in 2020.

Opening resistance and tear propagation resistance are measured as follows. Twenty 5×10 $cm^2$ samples of interlayer are cut before lamination. Two slits are cut from opposite edges in the middle of each sample, so as to separate the rectangle into two squares, each measuring 5×5 $cm^2$. The separation is incomplete, however, as an intact ligament remains between the two cuts. Each sample has a different ligament length l. All the samples have the same thickness b (e.g. 0.76 mm). Each sample is subjected to a tensile test at 20° C. and 100 mm/min until complete rupture. For each sample, the work W up to breakage is measured. The plot of W/lb as a function of I is a straight line extrapolated for I=0. The extrapolated value, in $J/m^2$, is the interlayer's intrinsic opening resistance and tear propagation resistance, independent of the sample geometry. Opening resistance and tear propagation resistance of up to 30 $kJ/m^2$ is demonstrated by failure of the pendulum test for interlayers whose glass-adhesive interlayer adhesion value measured by the TCT method at 33 $mm \cdot s^{-1}$ and 20° C. is between 4 $kJ/m^2$+8 $kJ/m^3$×e(mm) and 14 $kJ/m^2$+8 $kJ/m^3$×e(mm) and whose thickness is between 0.7 and 0.8 mm.

The invention is based on the fact that an insulating glazing, in particular of standard thickness, comprising a laminated glazing as thin as 3 to 6 mm thick, having both a glass-adhesive interlayer adhesion value and opening resistance and tear propagation resistance value of the adhesive interlayer disclosed above, satisfies levels 1B1 of standard EN 12600 and P1A of standard EN 356.

Preferably, the laminated glazing has a thickness of between 3.5 and 4.5, preferably 3.8 and 4.2, and particularly preferably 3.9 and 4.1 mm, and the adhesive interlayer has a thickness e of between 0.4 and 1.9 mm.

Preferably, the insulating glazing is a double glazing with a gas layer thickness of between 10 and 18 mm.

Preferably, the insulating glazing is a double glazing with a thickness of between 18 and 26 mm.

Preferably, the two glass sheets have identical or different thicknesses of between 1.05 and 3.1 mm, and are made of mineral glass such as float glass, soda-lime glass, aluminosilicate glass or borosilicate glass, possibly thermally tempered or chemically strengthened. The glass is colorless or tinted.

In this case, at least one of the two glass sheets advantageously carries at least one transparent functional layer or stack of layers such as obtained by magnetron-assisted sputtering, chemical vapor deposition (CVD), liquid process such as sol-gel, consisting of a thermal control, anti-sun, low-emissivity, anti-reflective, surface tension modifying, hydrophobic, hydrophilic, self-cleaning, photocatalytic layer or stack, an electrically conductive layer connected to an electric current source, anti-icing heating, anti-fogging.

Preferably, the adhesive interlayer consists of polyvinyl butyral (PVB), including acoustic trilayer (described in more detail in the examples below), and structural trilayer (relatively hard, low-plasticization PVB, as sold by Eastman under reference DG 41, or by Kuraray under reference Extra Stiff), ethylene-vinyl acetate (EVA), ionomer resin (as sold by Kuraray under the registered trademark SentryGlas®), polyethylene terephthalate (PET), thermoplastic polyurethane (TPU), cast resin, alone or several of them combined, notably in the form of a tough core layer (e.g. PET) between two softer skin layers (e.g. PVB).

The invention will be better understood in the context of the following examples, and of the appended drawings, in which FIG. 1 shows a cross-sectional view of an insulating glass unit according to the present invention;

FIG. 2 shows a sequence for investigating and determining the mean break height with three balls (MBH3) of a laminated glazing disclosed below, intended for use in insulating glazings according to the invention.

With reference to FIG. 1, the insulating glazing 1 comprises an assembly of a monolithic glazing 2 and a laminated glazing 3 separated by a cavity 4 containing an insulating gas. The laminated glazing 3 comprises two monolithic glass sheets 5*a*, 5*b* separated by an adhesive interlayer 6.

Although FIG. 1 shows an insulating glazing consisting of a single monolithic glazing and a single laminated glazing, the invention is not limited in these regards, and the insulating glazing could contain more than one laminated glazing, more than two glazings, whether laminated or monolithic, with the laminated glazing(s) having any place in the assembly constituting the insulating glazing.

To form a laminated glazing intended for use in an insulating glazing according to the invention, Jumbo-sized laminated glazings (6×3.21 $m^2$) are formed by bonding two glass sheets measuring 1.6 mm thick sold by Saint-Gobain Glass under the registered trademark Planiclear® via a 0.76 mm-thick layer of acoustic polyvinylbutyral (PVB) sold by Eastman under reference QS 41, which consists of a 0.12 mm thick core layer of softer (more plasticized) PVB between two surface layers of stiffer (harder) (less plasticized) PVB.

Six 1938×876 $mm^2$ samples of this laminated glazing were tested at a drop height of 0.45 m (level 2B2 of standard EN 12600) and six other samples were tested at a drop height of 1.2 m (level 1B1, the highest of standard EN 12600): none of the samples were broken by the impacts, and all passed the tests.

Ten 1100×900 $mm^2$ samples of this laminated glazing were tested at a drop height of 1.5 m: none were broken by the impact, satisfying level P1A of standard EN 356. Thirty-four other samples were tested using a sequence of searching for and determining the mean break height with three balls (MBH3), as disclosed previously, starting at a drop height of 2.1 m. The results are shown in FIG. 2. The abscissa shows the sequence numbers of the break tests with three balls, from 1 to 34. The ordinates show the drop heights of the three balls for each test. The result is shown as a disc in case of success (no break), or as a cross in the case of failure (break). In case of success, the next test is performed at a drop height of the three balls increased by one increment (30 cm); in the event of failure, the next test is performed at a drop height reduced by the increment. The mean break height value obtained is 2.83+/−0.32 m (95% confidence interval represented by the dashed line in FIG. 2), which is not very far from the performance of a thicker standard laminated glazing 22-2 (two 2.1 mm glass panes and a 0.76 mm interlayer—two 0.38 mm thicknesses): mean break height of 2.92 m, averaged over 5 different batches of at least 30 glazings, each measuring 1100×900 $mm^2$.

The measured adhesion between Planiclear® glass and the 0.76 mm thick layer of acoustic PVB (measured by the TCT method at 33 $mm \cdot s^{-1}$ and 20° C.) is 13.1 $kJ/m^2$. For standard PVB, this measured value ranges from 12.1 to 16.6 $kJ/m^2$ (minimum and maximum over 13 batches).

The measured opening resistance and tear propagation resistance of the 0.76 mm thick acoustic PVB layer is between 33 and 46 $kJ/m^2$ (minimum and maximum over 4 batches). For standard PVB, it ranges from 35 to 60 $kJ/m^2$ (minimum and maximum over 10 batches).

The acoustic performance of four double glazings with different compositions as defined below, comprising a 4 mm-thick monolithic glass, a 16 mm-thick gas layer and a second glazing, is described by the Rw, Ra and Ratr values given in the following table.

TABLE 1

| Composition of the double glazing | Rw (dB) | Ra (dB) | Ratr (dB) |
|---|---|---|---|
| 1 | 34 | 33 | 29 |
| 2 | 34 | 32 | 29 |
| 3 | 32 | 31 | 27 |
| 4 | 31 | 30 | 27 |

In these double glazing compositions, the second glazing consists of:

composition 1: two 2.1 mm glass panes bonded with a 0.76 mm layer of acoustic PVB as disclosed previously;

composition 2: two 1.6 mm glass panes bonded by a 0.76 mm layer of acoustic PVB (that is, the laminated glazing disclosed herein before at the beginning of these examples);

composition 3: two 2.1 mm glass panes bonded with a 0.76 mm layer of standard PVB; and—composition 4:4 mm monolithic glass.

The table shows that double glazing compositions 1 to 4 are ranked in descending order of acoustic performance. In particular, composition 2 using a 4 mm laminated glazing is better than composition 4 using a 4 mm monolithic glass, and even better than composition 3 using a 5 mm laminate with standard PVB. Composition 1 is better than composition 2 from an acoustic point of view, but the thickness of the 5 mm laminate makes it unsuitable for integration in a standard 24 mm double glazing with two 4 mm glazings and a 16 mm gas layer.

The wind behavior of two 0.96×1.56 $m^2$ double glazings is compared, the first with composition 4 above (two 4 mm monolithic glass panes) and the second with composition 2 above in accordance with the invention (one 4 mm monolithic glass pane and one 4 mm laminated glazing). The deflection of the double glazings under increasing wind load is measured. It can be seen that the values calculated in accordance with standard EN 16612 never vary, for each of the two double glazings, by more than 10% of the actual values measured. Moreover, the deflection of the double glazing with two monolithic glass panes remains lower by less than 10% than that of the double glazing of the invention comprising a 4 mm laminated glazing.

In addition, the breakage limits of these two double glazings are tested. On a batch of 10 double glazings with two 4 mm monolithic glass panes, none broke below 4200 Pa (wind speed 290 km/h). On a batch of 13 double glazings comprising a 4 mm laminated glazing, none broke below 2800 Pa (240 km/h wind speed). 4 of these 13 double glazings withstood a wind speed of 420 km/h without breaking. 3 of these double glazings comprising a 4 mm laminated glass pane were subjected to additional load cycles, consisting of:

20 cycles between 0 and +4200 Pa (1.5 times the theoretical limit of 2800 Pa of standard EN 16612 for this glazing size and composition), and 20 cycles between-4200 and 0 Pa, with a cycle period of 8 seconds. None of these three double glazings broke.

Double glazings conforming to the invention and comprising a laminated glazing different from that disclosed previously in the examples were tested:

- a double glazing differing from the one disclosed above only in that the two laminated glass panes are of different thicknesses, 1.1 mm and 2.1 mm instead of 2×1.6 mm, and thus bonded together by a 0.76 mm acoustic PVB;
- a double-glazed laminated glazing with a thickness substantially equal to 4 mm, whose adhesive interlayer, selected from those disclosed above, is between 0.4 and 1.9 mm thick (e.g. 2.86+/−0.1 mm glass pane—e.g. 2×1.4 mm glass pane—and 1.14+/−0.03 mm interlayer, 2.48+/−0.1 mm glass pane—e.g. 2×1.2 mm glass pane—and 1.52+/−0.04 mm interlayer, 2.1+/−0.1 mm glass pane—e.g. 2×1.05 mm glass pane—and 1.9+/−0.05 mm interlayer); it should be noted that 0.5-0.6 mm-thick trilayer acoustic PVB is commercially available;
- a double-glazed laminated glazing with a thickness substantially equal to 5 mm, e.g. 2×2.1 mm glass pane bonded by a 0.76 mm interlayer;
- a double-glazed laminated glazing with a thickness substantially equal to 6 mm, e.g. a 3.1 mm glass pane and a 2.1 mm glass pane bonded by a 0.76 mm interlayer.

All these glazings comply with the invention with regard to the values of glass-adhesive interlayer adhesion and opening resistance and tear propagation resistance of the adhesive interlayer. All these glazings meet levels 1B1 of standard EN 12600 and P1A of standard EN 356, and have good impact resistance properties.

The invention claimed is:

1. An insulating glazing comprising a parallel glazing assembly, two consecutive glazings in the assembly being separated by a cavity enclosing a gas layer, said insulating glazing comprising at least one laminated glazing, the at least one laminated glazing comprising two glass sheets between which is laminated an adhesive interlayer of thickness e, wherein the laminated glazing has a thickness of between 3 and 6 mm, a value of the adhesion of the glass to the adhesive interlayer measured by the TCT method at 33 $mm{\cdot}s^{-1}$ and 20° C. is between 4 $KJ/m^2$+8 $KJ/m^3$×e(mm) and 14 $KJ/m^2$+8 $KJ/m^3$×e (mm), and the adhesive interlayer has an opening resistance and a tear propagation resistance of greater than 30 $KJ/m^2$.

2. The insulating glazing according to claim 1, wherein the laminated glazing has a thickness of between 3.5 and 4.5 and the adhesive interlayer has a thickness e of between 0.4 and 1.9 mm.

3. The insulating glazing according to claim 1 the insulating glazing consisting of a double glazing whose gas layer has a thickness of between 10 and 18 mm.

4. The insulating glazing according to claim 1, the insulating glazing consisting of a double glazing whose thickness is between 18 and 26 mm.

5. The insulating glazing according to claim 1, wherein the two glass sheets have identical or different thicknesses of between 1.05 and 3.1 mm, and are made of mineral glass.

6. The insulating glazing according to claim 5, wherein at least one of the two glass sheets carries at least one transparent functional layer or stack of layers consisting of a thermal control, anti-sun, low-emissivity, anti-reflective, surface tension modifying, hydrophobic, hydrophilic, self-cleaning, photocatalytic layer or stack, an electrically conductive layer connected to an electric current source, anti-icing heating, anti-fogging.

7. The insulating glazing according to claim 1, wherein the adhesive interlayer consists of polyvinyl butyral (PVB), including acoustic trilayer, and structural trilayer, ethylene-vinyl acetate (EVA), ionomer resin, polyethylene terephthalate (PET), thermoplastic polyurethane (TPU), cast resin, alone or several of them combined.

8. The insulating glazing according to claim 2, wherein the laminated glazing has a thickness of between 3.8 and 4.2.

9. The insulating glazing according to claim 8, wherein the laminated glazing has a thickness of between 3.9 and 4.1.

10. The insulating glazing according to claim 5, wherein the mineral glass is a float glass, soda-lime glass, aluminosilicate glass or borosilicate glass.

11. The insulating glazing according to claim 10, wherein the mineral glass is thermally tempered or chemically strengthened.

12. The insulating glazing according to claim 6, wherein the at least one transparent functional layer or stack of layers is obtained by magnetron-assisted sputtering, chemical vapor deposition (CVD), liquid process such as sol-gel.

13. The insulating glazing according to claim 7, wherein the adhesive interlayer is in the form of a tough core layer between two softer skin layers.

* * * * *